E. J. BRING.
VALVE MECHANISM.
APPLICATION FILED JAN. 24, 1912.
1,180,373.
Patented Apr. 25, 1916.
5 SHEETS—SHEET 1.
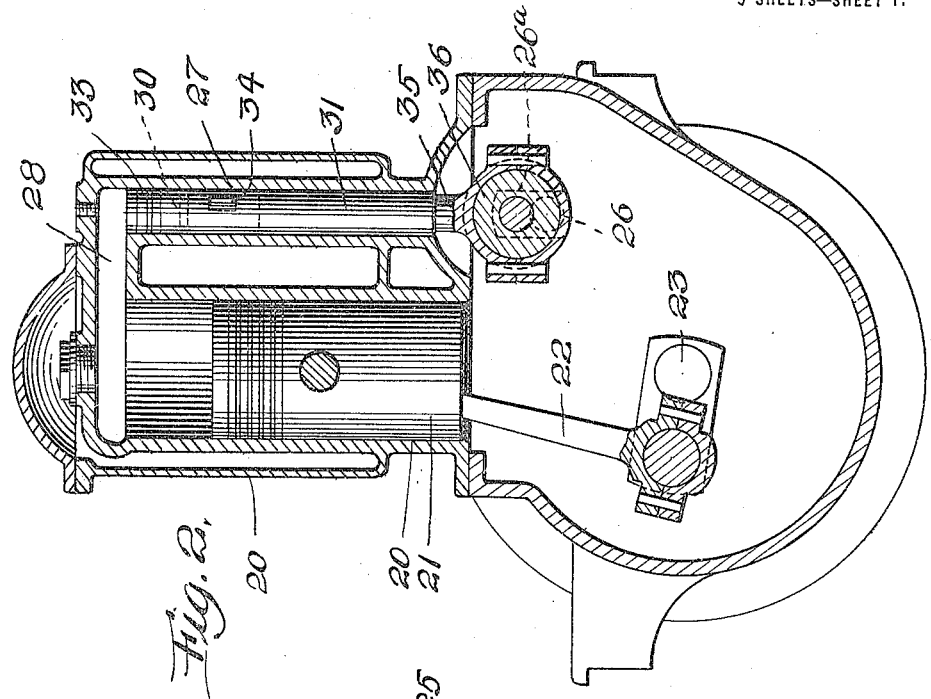
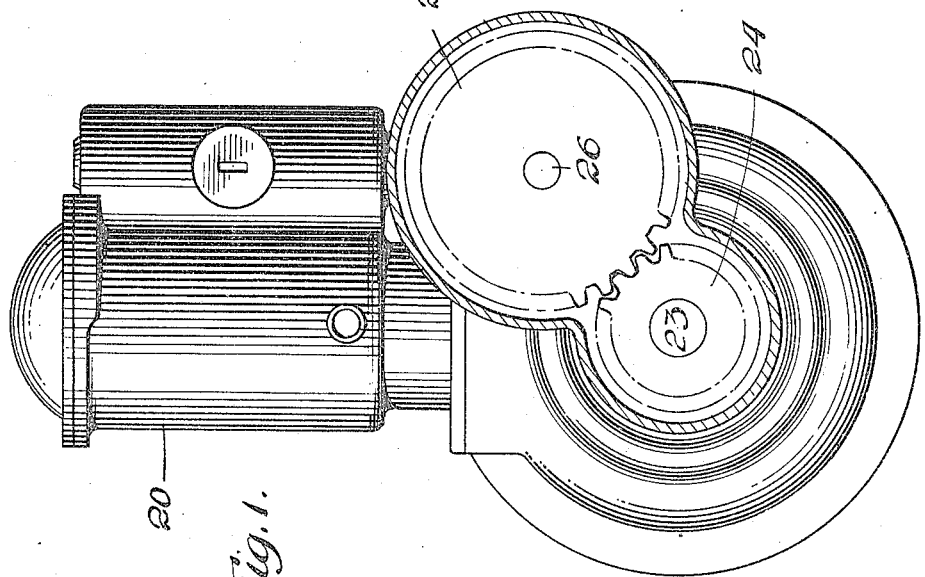
WITNESSES
Samuel Payne
Horace P. Seitz
INVENTOR
Einar J. Bring
BY
ATTORNEYS

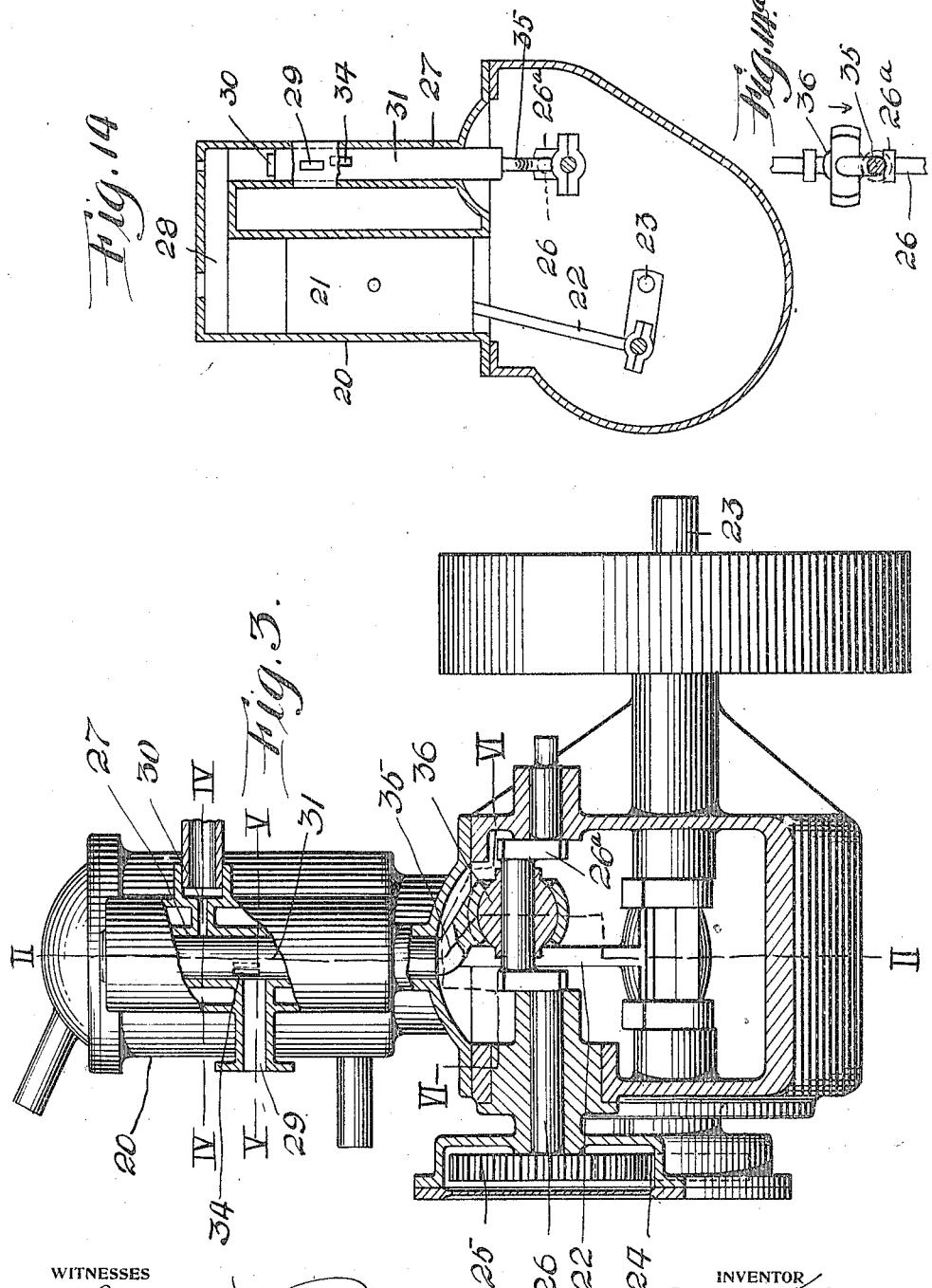

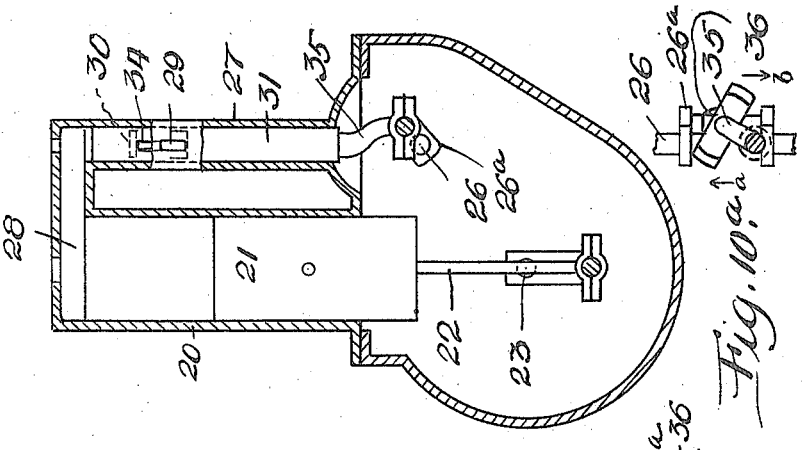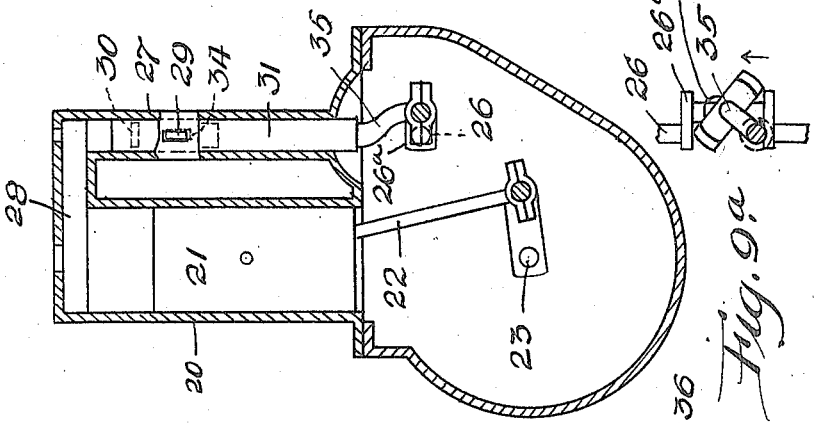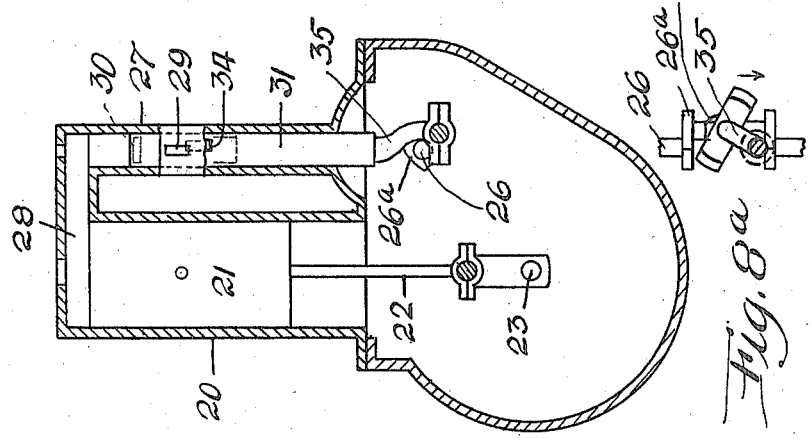

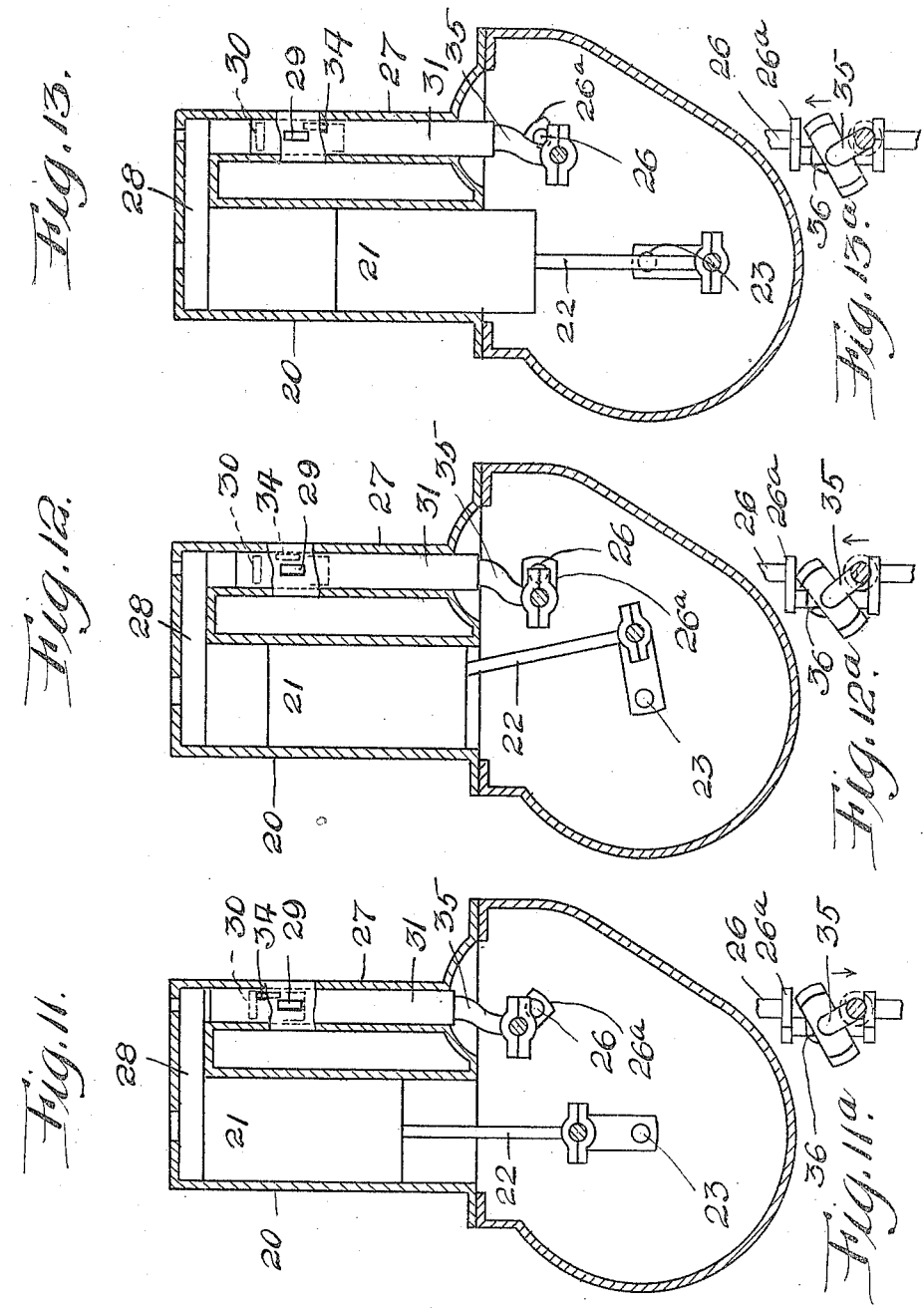

UNITED STATES PATENT OFFICE.

EINAR J. BRING, OF FRANKLIN, PENNSYLVANIA.

VALVE MECHANISM.

1,180,373. Specification of Letters Patent. Patented Apr. 25, 1916.

Application filed January 24, 1912. Serial No. 673,070.

*To all whom it may concern:*

Be it known that I, EINAR J. BRING, a citizen of the United States of America, residing at Franklin, in the county of Venango and State of Pennsylvania, have invented certain new and useful Improvements in Valve Mechanism, of which the following is a specification, reference being had therein to the accompanying drawing.

My invention relates to improvements in valve mechanism for controlling the supply and exhaust of apparatus employing a reciprocating system and more particularly to apparatus in which the operation is in cycles.

Among the objects of my invention are— (1) To provide a mechanism in which the control is provided by a slide valve member movable in a cycle, the movement being constant during the operation of the apparatus. (2) To provide a mechanism of this character adapted to control the intake and exhaust, the intake being through the valve member, and the exhaust external of the member. (3) To provide a mechanism of this character in which the cycle of the apparatus is provided by the movement of a valve member between two extremes of movement, the movement being from one extreme to the other and return, these movements controlling the supply and exhaust for the apparatus. (4) To provide mechanism of this character in which a slide member for controlling the supply and exhaust is given a reciprocating and oscillatory movement during the cycles of operation. (5) To provide a mechanism of this character which remains substantially unaffected by temperature conditions. (6) To provide a mechanism of this character in which a valve member is in constant operative connection with and moved by the piston operating mechanism to provide a constant movement to the valve member. (7) To simplify the valve-controlling mechanism of the general type indicated heretofore.

Other objects are to provide a construction which is simple and efficient in operation, durable in construction, readily installed and maintained, having a minimum number of parts, and which can be manufactured and applied at a relatively low cost.

To these and other ends, the nature of which will be readily understood as my invention is hereinafter disclosed, said invention consists in the improved construction and combination of parts hereinafter fully described, illustrated in the accompanying drawings, and particularly pointed out in the appended claims.

Figure 4:
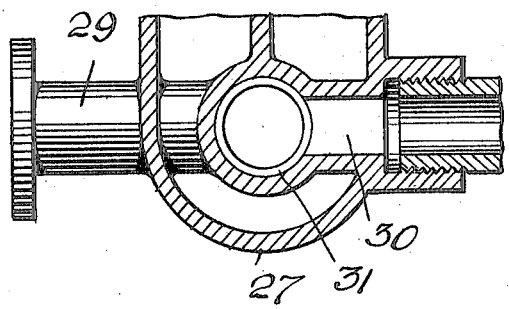
Figure 5:
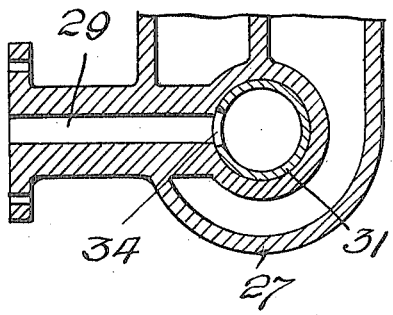
Figure 6:
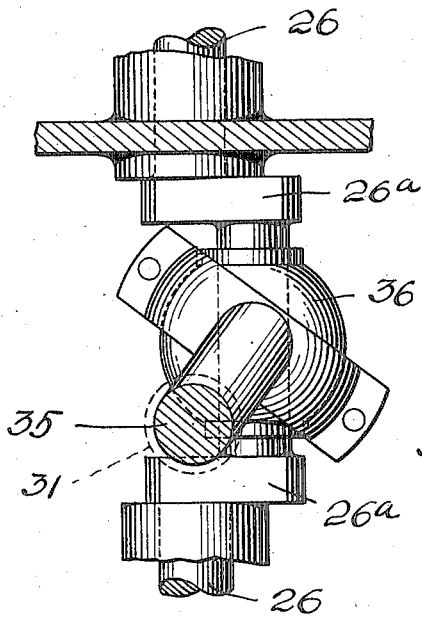
Figure 7:
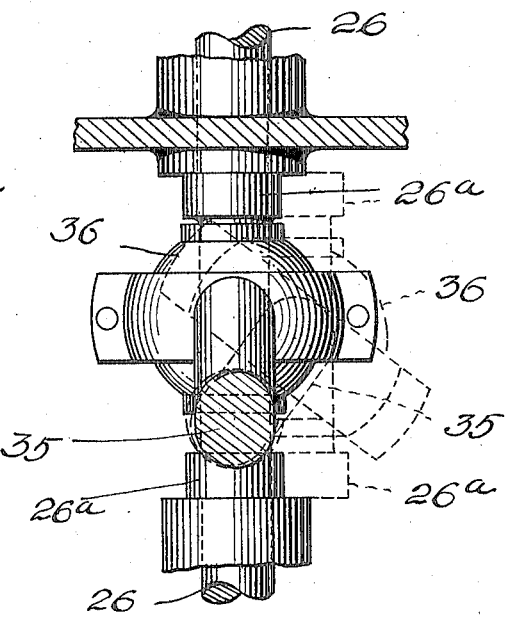

In the accompanying drawings, in which similar reference characters indicate corresponding parts in each of the views,—Figure 1 is a front elevation of an internal combustion engine, parts being shown in section. Fig. 2 is a vertical sectional view of the same taken on the line II—II of Fig. 3, the valve being shown in full lines. Fig. 3 is a view partly in section and partly in elevation taken at right angles to Figs. 1 and 2. Fig. 4 is a horizontal sectional view taken on the line IV—IV of Fig. 3. Fig. 5 is a sectional view taken on the line V—V of Fig. 3. Fig. 6 is an enlarged detail sectional view taken on the line VI—VI of Fig. 3. Fig. 7 is a view similar to Fig. 6, showing the parts in another position of the valve-operating member, the dotted line position substantially corresponding to the position of Fig. 6. Figs. 8 to 14, inclusive, are diagrammatic views illustrating the position of parts at successive stages in the operation of the motor. Figs. 8$^a$ to 14$^a$ are respectively diagrammatic views showing the position of operating elements at different stages in the operation of the motor, the two sets of diagrammatic views showing corresponding positions.

The present invention, while capable of use in connection with various types of apparatus, as heretofore pointed out, is particularly designed for use in connection with internal combustion motors, and for the purpose of explaining the invention in greater detail, I have shown it as applied to a four-cycle engine, it being understood that the valve mechanism is employed in connection with each cylinder of the motor. As will be obvious, the particular structure of the engine casing forms no part of the subject matter of the present invention, and that illustrated in the drawings is simply intended to represent a conventional form of motor in which certain parts are required in connection with the present invention, and in describing these parts I will make reference only to the parts necessary to explain the operation of my improved mechanism.

20 designates the cylinder, 21 the piston therein, 22 the piston rod, and 23 the crank shaft to which the piston rod is connected. The forward end of the crank shaft, is, in the illustrated form of apparatus, provided with a gear 24, meshing with a gear 25 carried by a crank shaft 26 extending parallel to the crank shaft 23. Where the mechanism to be described is employed with a four-cycle motor, I arrange a two-to-one relationship between the gears 24 and 25 with smaller gear carried by the shaft 23. And while I have referred to this connection between shafts 23 and 26 as a gear connection, it will be readily understood that any other form of transmission between these shafts may be employed as long as the same provides a positive drive connection therebetween in a manner to preserve the relationship referred to. Where a motor having a different cycle is provided, as for instance a two-cycle motor, the relationship between the shafts 23 and 26 is changed to provide equal movement, the purpose being to provide one complete revolution to crank shaft 26, while the piston passes through its entire cycle of operation.

27 designates a valve casing or chamber in the form of a cylinder and which has its upper end in communication with the upper end of its main cylinder, through a passageway 28, the term upper being used simply to indicate the end of the parts in the position shown in the drawing, it being understood that where the structure is shifted to a different position, the relative arrangement is retained. As shown in Fig. 3, casing or chamber 27 is provided with a port 29, communicating with the supply, not shown, such as a carbureter, and with a port 30, constituting the exhaust port, the ports in the form shown being located on opposite sides of the chamber and positioned with the exhaust port on a plane above the inlet port. Obviously, the relative position of the ports, so far as the location on a horizontal plane is concerned, is immaterial, the essential being that the exhaust port be located above the inlet port.

31 designates a valve member adapted to fit within chamber 27 and be movable axially of said chamber, member 31 being shown as provided with suitable packing members 33. Said member 31 is preferably hollow, at least for a distance sufficient to extend to the lower end of an inlet port 34 extending through the wall thereof, the member being open at the top to passage 28. The lower end of member 31 is provided with a crank 35, the free end of which is mounted on a crank 26ᵃ of shaft 26, the form of mounting shown in the drawings being that of a spherical member 36 mounted to permit of movement axially on the crank 26ᵃ of crank shaft 26, said body being mounted within a complemental portion formed on crank 35, the structure providing for an operation similar to a universal joint. As will be readily understood, the particular form in which this connection is provided may be varied, and it is to be understood that this variation will fall within the scope of the invention, the object being to provide for combinations of movements by the rotation of shaft 26. The axis of the shaft 26 preferably intersects the axis of member 31, while cranks 26ᵃ and 35 are of a relative size to permit crank 26ᵃ to revolve above the axis of shaft 26 and during such movement impart an oscillatory movement to member 31, the length of oscillation being insufficient to provide a complete rotation to the member. The member 31 is of a length such that when crank 26ᵃ is in its uppermost position, valve member 31 will have its upper end in proximity to the upper end of the casing or chamber 27, while the length of crank 26ᵃ is such that when it reaches its lowest point, the upper end of member 31 will have completed the exposure of exhaust port 30 by passing below the plane of said port. The ports 29 and 34 are relatively positioned so as to communicate on the upward movement of member 31, the position being such that member 31, during the exhaust movement of the piston will have uncovered and re-covered the exhaust port and placed opening 34 in position to begin communication with port 29, as the piston begins its succeeding stroke.

As will be readily understood, crank 26ᵃ will cause member 31 to have a reciprocating motion within chamber 27. In addition to this movement, however, the use of crank 35 gives an additional movement to member 31, the rotation of crank 26ᵃ causing the member to be given an oscillating or twisting movement simultaneously with the reciprocating movements, these movements being indicated in Figs. 8 to 14. It is this combined operation which provides for the particular advantages which result from my construction.

The particular operation of the valve mechanism herein disclosed, when applied to a four-cycle motor, and as graphically illustrated in Figs. 8 to 14 inclusive will be as follows, it being assumed that the shaft 23 is moving clockwise and the shaft 26 counter-clockwise: What may be considered as the beginning of each cycle of the motor is shown in Fig. 8, in which the piston is shown at the upper end of the cylinder, and the valve member in a position where ports 29 and 34 are about to pass into communication; Fig. 8ᵃ discloses the corresponding position of body 36 on crank 26ᵃ. Assuming the movement to begin from this position, a movement of the parts to the position shown in Fig. 9, brings ports 29 and 34 into registration, member 31 having moved upwardly by the swinging of crank 26ª, this movement at the same time causing body 36 to move axially of crank 26ª in the direction of the arrow shown in Fig. 8ª, being due to the fact that since the axis of member 31 is in a fixed line while the corresponding axis of member 36 describes a path corresponding to the travel path of crank 26ª, the length of the connection between these axes being fixed or constant, shifting of the axis of member 36 slidably on the crank results, this shifting being in correspondence with the relative or oscillating movement of member 31, and when body 36 has reached the farther position (the point where crank 26ª is in a true horizontal plane) the rotative movement in one direction ends; in this position the piston has made a partial movement lengthwise of the cylinder approximating one-half of the first (suction) step of the cycle. A continuation of the movement of the piston to the position shown in Fig. 10, which movement completes the first step of the cycle, causes a continuation of the movement of crank shaft 26ª in a direction to tend to bring said shaft in a vertical plane, and this action causes body 36 to have its return movement in the direction of the arrow shown in Fig. 9ª to the position shown in Fig. 10ª, placing the valve member in substantially the same position with respect to a line drawn vertically through port 34 as in the position shown in Fig. 8, but during this step, member 31 has moved upwardly a distance sufficient to carry port 34 from a point below port 29 to a point above said port, the rotating movement of valve member 31 having been in both directions, causing the axis of port 34 to traverse a curved line. As will be obvious from an inspection of Figs. 8, 9 and 10, exhaust port 30 has remained closed during this step, being closed by member 31, and it may be mentioned that this closed condition remains until the operation has reached the point shown in Fig. 13.

The end of the second step (the compression step) finds the parts in the position shown in Fig. 11, the movement of crank 26ª having caused it to reach and pass a vertical plane, during which movement member 31 has reached its upper limit of movement, and body 36 has moved in the direction of arrow a in Fig. 10ª and then in the direction of arrow b, to the position shown in Fig. 11ª, said body having passed its extreme of movement in the opposite direction axially of the crank 26ª; this movement of the crank has caused member 31 to continue its oscillation with the result that port 34 moves to one side of the vertical plane of port 29; and it will also be seen that during this cycle step the piston and the member have been moving in the same direction, thereby causing a maximum compression of the charge.

The end of the third step is shown in Fig. 13, Fig. 12 illustrating the intermediate position more particularly for the purpose of illustrating the relative position of ports 29 and 34 during this step, the position showing crank 26ª as in approximately its horizontal plane, which position marks the extreme of oscillation of member 31, body 36 having moved in the direction of the arrow in Fig. 11ª. As will be seen by reference to Fig. 12, the oscillation of member 31 positions port 34 so that during the downward or return movement of member 31, said port, while passing the horizontal plane of port 29 passes entirely to one side of said port, so that ports 29 and 34 do not communicate during this movement. It is this fact that enables me to provide the proper action of the inlet and exhaust by the use of a single member slidable longitudinally of the cylinder, the advantages of which will be presently pointed out. Upon the completion of the third step of the cycle shown in Fig. 13, it will be seen that member 31 has passed to a position where its upper edge is close to the top of exhaust port 30, while port 34 has been moved downwardly to a point where it is practically below the plane of port 29, member 31, having in the meantime commenced its return oscillatory movement due to the action of body 36 moving in the direction of the arrow shown in Fig. 12ª.

The third or explosion step of the cycle having been completed, the final or exhaust step of the cycle is begun, and during this step, member 31 reaches its lowermost position (shown in Fig. 14), this movement entirely exposing the exhaust port above the top plane of member 31, body 36, in reaching this position, having moved in the direction of the arrow shown in Fig. 13ª. A completion of this step carries the parts to the position shown in Fig. 8, the exhaust port being closed by the upward movement of member 31, this movement placing port 34 in proper position to begin the first step of the next cycle. During this movement, body 36 moves in the direction of the arrow shown in Fig. 14ª.

As will be seen, the path described by port 34 is such as to form practically an inclosure, the particular curvature of the path being provided by the combination of the reciprocating and twisting or oscillating movements.

As will be seen from the drawings, the movement of member 31 toward passageway 28 is limited so as to practically retain the upper end of the member below the plane of said passageway, so that said member does not affect said passageway as an obstruction; as a result there is no requirement that the wall of the member above port 34 be of material thickness, as it is not required to withstand any pressure in a direction where the wall is unsupported, any pressures that are applied to said wall being exerted in directions in which the wall is supported by the casing. Furthermore, crank-shafts 23 and 26 are so connected that piston 21 and member 31 move in the same direction (away from passageway 28) during the explosion step of the cycle, part of the pressure from the explosion being absorbed by member 31 and delivered to crank-shaft 23 through valve-shaft 26 and gears 25 and 24, thereby preventing loss of power, member 31 acting somewhat in the nature of a supplemental piston of relatively small area in the driving operation. As will be understood, this pressure on member 31, being delivered in a direction substantially corresponding to the direction of length of the member and within the hollow portion thereof, there is no material tendency to place unequal lateral pressure on the member during the explosion step, thus eliminating tendency of the member to bind. In addition, the location of port 34 substantially midway of the length of member 31, places it in a position where any tendency of the ends of the member to wear under any tendency to cant which might be provided by reason of the crank-like relation of part 35 to member 31, would not affect that portion of member 31 adjacent this port, the result being that while wear may be present in the member in use, this wear becomes unimportant as a factor, since the point where leakage becomes an important factor is that portion of the valve around the intake port, and this is substantially protected through the particular arrangement referred to.

From the above, it will be readily understood that valve member 31 is substantially free from the effects of the exploded gases, the exhaust being entirely above the member. This fact, coupled with the fact that the entering charge, which is comparatively cool, passes through the wall of the member and upwardly through the interior thereof, causes the member to be comparatively free from the heating effect usual in devices of this type employed in connection with internal combustion engines or motors. As a result, there are no bad effects from expansion or contraction, nor is there any material difficulty had in maintaining a workable temperature. It should also be noted that all of the movements of member 31 being positive and with continuity, renders the liability of sticking extremely doubtful.

While my invention is primarily designed for use in connection with internal combustion motors and I have disclosed it mainly in connection with such use, I believe the invention to be of broader scope and suitable for other purposes, and I therefore desire it to be understood that no specific application which may have been herein made shall be held to exclude other applications of the same general idea embodied herein, the structural and operative characteristics of which are equivalents of those herein set forth, even though such apparatus may be utilized in different relations to effect a specifically different result. For instance, the mechanism herein disclosed, by a slight modification therein may be employed in connection with air compressors, member 31, in this instance, being employed in a construction involving a separate piston or may itself form the piston or a portion of a piston structure.

While I have shown the valve mechanism as located at a point spaced from the axis of the piston, it will be readily understood, by a slight change in the operating connections, member 31 may be in the form of a sleeve surrounding the piston, such change however would add another oil film for the purpose of lubricating and heat extraction, a requirement which is not essential in the form disclosed in the drawings.

Obviously, changes and modifications in the construction and arrangement of the parts may be required or desired to meet the various conditions of use to which the mechanism may be applied, and I desire it to be understood, that I reserve the right to make any and all changes and modifications therein as may be required or desired, in so far as the same may fall within the spirit and scope of the invention as expressed in the accompanying claims.

Having thus described my invention, what I claim as new is:

1. In combination, a piston chamber, a piston therein, intake and exhaust ports adapted to communicate with said chamber through a single passage-way, and a movable element for controlling the activity of said ports, said element having a ported passageway therethrough solely for the intake, said passageway being permanently open to said piston chamber, the movements of the element controlling the exhaust port, the element having its movements timed to provide movements of the piston and element in the same direction during the explosion stroke of the piston, whereby the force of the explosion will be exerted on both parts in a direction corresponding to their directions of movement.

2. In combination, a piston chamber, a piston therein, intake and exhaust ports adapted to communicate with said chamber, and a movable element for controlling the activity of said ports, said element having a combined reciprocating and oscillating motion and also having a ported passageway therethrough solely for the intake, said passageway being permanently open to said piston chamber, the movements of the element controlling the exhaust port.

3. In combination, a piston chamber, a piston therein, intake and exhaust ports, and a movable element for controlling the activity of said ports, said element having a ported passageway therethrough solely for the intake, said passageway being permanently open to said piston chamber, the movements of the element controlling the exhaust port independent of said passageway, the element having its movements timed to provide movements of the piston and element in the same direction during the explosion stroke of the piston, whereby the force of the explosion will be exerted on both parts in a direction corresponding to their directions of movement.

4. In an internal combustion motor, and in combination, a piston chamber, a piston therein, and a movable element for controlling the intake and exhaust to and from said chamber, said element being positionable to provide passage of the exhaust over its end and the intake through such end to reduce the heating effect of the exhaust gases on the element, said element during the explosion stroke of the motor, being positioned to receive the explosion force in the direction in which the element is moving.

5. In an internal combustion motor and in combination, a piston chamber, a piston therein, a chamber communicating with said piston chamber, said latter chamber having intake and exhaust ports communicating with the piston chamber through a single passage-way, and an element movable longitudinally of said latter chamber to control said intake and exhaust ports, said element being positionable to provide passage of the exhaust over its end to reduce the heating effect of the exhaust gases on the element, the element having its movements timed to provide movements of the piston and element in the same direction during the explosion stroke of the piston, whereby the force of the explosion will be exerted on both parts in a direction corresponding to their directions of movement.

6. In an internal combustion motor and in combination, a piston chamber, a piston therein, and a supplemental open-ended piston for controlling the intake and exhaust to and from said chamber, one end of said supplemental piston forming the passage-way for the intake and also controlling said exhaust port, the supplemental piston having its movements timed to provide movements of both pistons in the same direction during the explosion stroke of the main piston, whereby the force of the explosion will be exerted on both pistons in a direction corresponding to their directions of movement.

7. In combination, a chamber having intake and exhaust ports, a piston therein movable to control said ports, a rotating crank shaft, a bearing thereon, and a connection of fixed length between said bearing and the piston to provide combined reciprocating and oscillating movements to the piston.

8. In an internal combustion motor and in combination a piston chamber, a piston therein, and a supplemental open-ended piston for controlling the intake and exhaust to and from said chamber, said pistons having their axes extending in substantially parallel planes, one end of said supplemental piston forming the passage-way for the intake and also controlling said exhaust port, the supplemental piston having its movements timed to provide movements of both pistons in the same direction during the explosion stroke of the main piston, whereby the force of the explosion will be exerted on both pistons in a direction corresponding to their directions of movement.

9. In an internal combustion motor and in combination, a piston chamber, a piston therein, and a supplemental piston for controlling the intake and exhaust to and from said chamber, said pistons having their axes extending in substantially parallel planes, said supplemental piston having a passage-way therethrough adapted to communicate with the intake port, said passage extending longitudinally of the piston, said passage-way being permanently open to the cylinder.

10. In an internal combustion motor and in combination, a piston chamber, a piston therein, and a supplemental piston for controlling the intake and exhaust to and from said chamber, said pistons having their axes in substantial parallelism, said supplemental piston having a ported passageway solely for the intake, said passageway extending longitudinally of the piston and being permanently open to the cylinder.

11. In an internal combustion motor and in combination a piston chamber, a piston therein, and a supplemental piston for controlling the intake and exhaust to and from said chamber, said pistons having their axes in substantial parallelism, said supplemental piston having a ported passageway solely for the intake, said passage-way being permanently open to the piston chamber, the exhaust port being controlled by the inner end of said piston, the supplemental piston having its movements timed to provide movements of both pistons in the same direction during the explosion stroke of the main piston, whereby the force of the explosion will be exerted on both pistons in a direction corresponding to their directions of movement.

12. In an internal combustion motor and in combination, a piston chamber, a piston therein, a supplemental chamber in open communication with the piston chamber, said supplemental chamber also having a piston, said pistons having their axes in substantial parallelism, said supplemental chamber having intake and exhaust ports adapted to communicate with the piston chamber, through a single passage-way, said passageway being permanently open to the piston chamber, the exhaust port being controlled by one end of the supplemental chamber piston, the supplemental piston having its movements timed to provide movements of both pistons in the same direction during the explosion stroke of the main piston, whereby the force of the explosion will be exerted on both pistons in a direction corresponding to their directions of movement.

13. In an internal combustion motor and in combination, a piston chamber, a piston therein, and a movable element for controlling the intake and exhaust to and from said chamber, said element having an open end and being positioned to provide passage of the exhaust over its inner end and also having a passageway for the intake leading through the open end of the element, whereby the heating effect of the exhaust gases on the element is reduced to permit the cooling effect of the intake to maintain the element substantially cool, the supplemental piston having its movements timed to provide movements of both pistons in the same direction during the explosion stroke of the main piston, whereby the force of the explosion will be exerted on both pistons in a direction corresponding to their directions of movement.

14. In an internal combustion motor and in combination, a piston chamber, a piston therein, and a supplemental piston for controlling the intake and exhaust to and from said chamber, said element being substantially tubular at its inner end with the tubular portion permanently open to the cylinder and also having a passageway for the intake leading to said tubular end, the free end of the tubular portion acting to control the exhaust port.

15. In an internal combustion motor and in combination, a piston chamber, a piston therein, a supplemental chamber communicating with the piston chamber and also having a piston, connections between said pistons to provide movements in ratio between them, intake and exhaust ports in said supplemental chamber walls, said supplemental piston having a passageway leading therethrough permanently open to the cylinder and adapted to intermittently communicate solely with the intake port, the inner end of the latter piston controlling the exhaust port.

16. In an internal combustion motor and in combination, a combustion chamber, a piston therein, a crank-shaft for said piston, and an open ended element out of axial alinement with the piston and adapted to control the intake and exhaust to and from said chamber, said element having its interior in permanent communication with the piston chamber and being operatively connected to said crank-shaft and mounted to reciprocate in a plane parallel to the piston, said mounting additionally acting to provide an oscillating movement on a vertical axis.

17. In an internal combustion motor and in combination, a combustion chamber, a piston therein, a crank-shaft connected to said piston, an open-ended element out of axial alinement with said piston and having its interior in permanent communication with the piston chamber, said element being adapted to control the inlet and exhaust to and from said chamber, and a supplemental crank-shaft operatively connected to the piston crank-shaft, said element and said supplemental crank-shaft having a single connection to provide reciprocations to the element in a vertical plane and additionally an oscillating movement of the element on a vertical axis.

18. In an internal combustion motor, the combination with the combustion chamber and its piston, of means for controlling the intake and exhaust to and from said chamber, said means comprising an open-ended piston out of axial alinement with the chamber piston and having its interior in permanent communication with the piston chamber, said means piston being movable over the intake and exhaust ports for the chamber, the direction of travel of said pistons being in parallel planes, a crank-shaft operatively connected to the crank-shaft of the chamber piston, said controlling piston and the supplemental crank-shaft having a single connection to cause the controlling piston to reciprocate in a vertical plane and oscillate on a vertical axis.

19. In combination, a chamber having intake and exhaust ports, a piston therein movable to control said ports, a rotating crank-shaft, and a connection of fixed length between said shaft and the piston to provide combined reciprocating and oscillating movements to the piston, said connection being located entirely below the body-portion of the piston.

20. In combination, a chamber having intake and exhaust ports, a piston therein movable to control said ports, a rotating crank-shaft, and a single connection between said shaft and the piston to provide combined reciprocating and oscillating movements to the piston, said connection comprising an arm carried by the lower end of the piston, said arm having its outer end connected to the crank-shaft with the point of connection spaced a constant distance from and offcenter with respect to the plane of the axis of the piston.

21. In an internal combustion motor, a piston therein, intake and exhaust ports for and adapted to communicate with said chamber through a single passageway, and an element movable as a unit for controlling said ports, said element and piston having their movements synchronized to cause the explosive force to act on both parts in the same direction.

22. In an internal combustion motor, an explosion chamber including a piston and having intake and exhaust ports communicating therewith through a common passage-way, and an element movable as a unit for controlling said ports, said element being connected up to act as an auxiliary piston in the motor during the explosion stroke of the chamber piston.

23. In an internal combustion motor, a piston chamber, a valve chamber spaced from said piston chamber, a passage-way connecting said chambers at one end, said valve chamber having the intake and exhaust ports for the piston chamber, said ports communicating with the piston chamber solely through said communicating passage-way, a piston in the piston chamber, and a valve element in the valve chamber and operatively connected to move in synchronism with the piston, said valve element having its movements limited to prevent entrance into said passage-way, whereby the explosion force of the piston chamber will be exerted in the direction of travel of the valve element.

24. In combination, two chambers out of axial alinement and connected at corresponding ends by a passage-way, a piston in one of said chambers, the other chamber having the intake and exhaust adapted to communicate with the piston chamber through said passage-way, and a movable element within said ported chamber for controlling said intake and exhaust ports, the movements of said element being restricted to said chamber, whereby force generated in said piston chamber will be exerted in the direction of length of the ported chamber.

25. In an internal combustion motor, an explosion chamber having intake and exhaust ports adapted to communicate therewith through a common passage-way, and a movable element for controlling said ports, the intake passageway for the chamber passing through the element, the element passage-way being permanently open to said chamber-communicating passage-way with the intake entrance to the element at a point intermediate and spaced from the ends of the element, whereby canting effect under movements of the element will be substantially ineffective to provide leakage in the vicinity of the intake.

26. In an internal combustion motor, an explosion chamber having an intake port adapted to communicate therewith through a passage-way, and a movable element for controlling said port, said element having a channel in permanently open communication with said passage-way for the passage of the intake to the chamber, the entrance to said channel being at a point intermediate and spaced from the ends of the element and located to be substantially un-affected by canting affects of the element.

27. In controlling mechanism, a chamber having intake and exhaust ports, a slidable element therein adapted to act as a valve to control said ports, said element being open at one end and having an internal channel leading to and in permanently open communication with said chamber through said open end, a crank shaft, and a connection between said shaft and the element to provide a combined reciprocating and oscillating movement to the element.

28. In controlling mechanism, a chamber having intake and exhaust ports, a slidable element therein adapted to act as a valve to control said ports, said element being open at one end and having an internal channel leading to and in permanently open communication with said chamber through said open end, a crank shaft, and a connection between said shaft and the element to provide a combined reciprocating and oscillating movement to the element, said connection being carried by an end of the element.

29. In controlling mechanism, a chamber having intake and exhaust ports, a slidable element therein adapted to act as a valve to control said ports, said element being open at one end and having an internal channel leading to and in permanently open communication with said chamber through said open end, a crank shaft, and a connection between said shaft and the element to provide a combined reciprocating and oscillating movement to the element, said connection being rigidly carried by an end of the element.

30. In controllng mechanism, a chamber having intake and exhaust ports, a slidable element therein adapted to act as a valve to control said ports, said element being open at one end and having an internal channel leading to and in permanently open communication with said chamber through said open end, a crank shaft, and a connection between said shaft and the element, the rotation of the crank shaft causing the connection to reciprocate thereon, whereby combined reciprocation and oscillation of the element will be had.

31. In controlling mechanism, a chamber having intake and exhaust ports, a slidable element therein adapted to act as a valve to control said ports, said element being open at one end and having an internal channel leading to and in permanently open communication with said chamber through said open end, a crank shaft, and a connection between said shaft and the element, said connection including a bearing mounted on the crank shaft and adapted to reciprocate thereon during rotation of the crank shaft to provide combined reciprocating and oscillating movements to the element.

32. In controlling mechanism, a chamber having intake and exhaust ports, a slidable element therein adapted to act as a valve to control said ports, said element being open at one end and having an internal channel leading to and in permanently open communication with said chamber through said open end, a crank shaft, and a connection between said shaft and the element, said connection including a bearing mounted on the crank shaft and adapted to reciprocate thereon during rotation of the crank shaft to provide combined reciprocating and oscillating movements to the element, the axis of said element being out of alinement with a bearing axis, extending at right angle to the direction of length of the crank on which the bearing is mounted.

33. In controlling mechanism, a chamber having intake and exhaust ports, a slidable element therein adapted to act as a valve to control said ports, said element being open at one end and having an internal channel leading to and in permanently open communication with said chamber through said open end, a crank shaft, and a connection between said shaft and the element, said connection including a bearing mounted on the crank shaft and adapted to reciprocate thereon during rotation of the crank shaft to provide combined reciprocating and oscillating movements to the element, said connection being in the form of an arm, projecting laterally from the end of the element and having said bearing at the opposite end of the arm.

In testimony whereof I affix my signature in the presence of two witnesses.

EINAR J. BRING.

Witnesses:
MAX H. SROLOVITZ,
HORACE G. SEITZ.

Copies of this patent may be obtained for five cents each, by addressing the "Commissioner of Patents, Washington, D. C."